US008210547B2

(12) United States Patent  (10) Patent No.: US 8,210,547 B2
Rodenbeck  (45) Date of Patent: Jul. 3, 2012

(54) ACTIVE MAGNETO-RHEOLOGICAL SPRING ASSEMBLIES AND VEHICLE SUSPENSION SYSTEMS INCORPORATING THE SAME

(75) Inventor: Phillip David Rodenbeck, Valparaiso, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 266 days.

(21) Appl. No.: 12/485,352

(22) Filed: Jun. 16, 2009

(65) Prior Publication Data

US 2010/0314842 A1 Dec. 16, 2010

(51) Int. Cl.
  *F16F 13/30* (2006.01)
(52) U.S. Cl. .................................................. 280/5.516
(58) Field of Classification Search ............... 280/5.516; 267/145, 151–153, 179; 188/267, 267.2
  See application file for complete search history.

(56) References Cited

U.S. PATENT DOCUMENTS

| 3,377,221 A | 4/1968 | Hawkes |
| 4,729,459 A * | 3/1988 | Inagaki et al. ............. 188/266.5 |
| 4,892,328 A * | 1/1990 | Kurtzman et al. ......... 280/5.507 |
| 5,161,653 A * | 11/1992 | Hare, Sr. .................... 188/267.1 |
| 5,492,312 A | 2/1996 | Carlson |
| 5,607,996 A | 3/1997 | Nichols et al. |
| 5,609,353 A | 3/1997 | Watson |
| 5,814,999 A * | 9/1998 | Elie et al. ....................... 324/662 |
| 5,816,587 A | 10/1998 | Stewart et al. |
| 5,878,851 A | 3/1999 | Carlson et al. |
| 5,974,856 A | 11/1999 | Elie et al. |
| 6,460,662 B2 | 10/2002 | Niaura et al. |
| 6,842,671 B2 | 1/2005 | Tropper |
| 6,860,146 B2 | 3/2005 | Dufournier |
| 6,989,065 B2 | 1/2006 | Tabor et al. |
| 7,018,102 B1 | 3/2006 | Brotz |
| 7,044,180 B2 | 5/2006 | Rhyne et al. |
| 7,086,507 B2 | 8/2006 | Hitchcock et al. |
| 7,102,474 B2 * | 9/2006 | Lerner et al. ................... 335/229 |
| 7,137,634 B2 | 11/2006 | Oh |
| 7,261,834 B2 | 8/2007 | Fuchs et al. |
| 7,322,588 B2 * | 1/2008 | Vandaele ................. 280/93.515 |
| 7,654,540 B2 * | 2/2010 | Parison et al. .................. 280/5.5 |
| 2002/0185347 A1 * | 12/2002 | Pohl et al. .................... 188/267.1 |
| 2003/0106626 A1 | 6/2003 | Steinke |
| 2005/0011710 A1 * | 1/2005 | Hitchcock et al. ......... 188/267.2 |
| 2005/0040922 A1 * | 2/2005 | Lerner et al. ................... 335/229 |
| 2005/0116194 A1 * | 6/2005 | Fuchs et al. ................. 252/62.54 |
| 2005/0205364 A1 | 9/2005 | Browne et al. |
| 2005/0263359 A1 * | 12/2005 | Mankame et al. ......... 188/266.1 |
| 2006/0220330 A1 * | 10/2006 | Urquidi et al. ............. 280/5.516 |
| 2008/0066842 A1 | 3/2008 | Steinke et al. |
| 2008/0216285 A1 * | 9/2008 | Browne et al. ............... 16/110.1 |
| 2009/0166976 A1 * | 7/2009 | Rubner-Petersen et al. .. 277/315 |

* cited by examiner

*Primary Examiner* — Paul N Dickson
*Assistant Examiner* — Robert A Coker
(74) *Attorney, Agent, or Firm* — Dinsmore & Shohl LLP (57) ABSTRACT

A Magneto-Rheological Elastomer (MRE) spring system includes a spring, an MRE unit in cooperation with the spring, and an electromagnet. The electromagnet may be configured to produce an adjustable magnetic field, wherein when the electromagnet produces a magnetic field, the MRE unit stiffens such that the MRE spring system stiffens.

18 Claims, 5 Drawing Sheets

ACTIVE MAGNETO-RHEOLOGICAL SPRING ASSEMBLIES AND VEHICLE SUSPENSION SYSTEMS INCORPORATING THE SAME

TECHNICAL FIELD

The present invention generally relates to springs, and more specifically, to dynamically controlled magneto-rheological elastomer (MRE) springs for vehicles with adjustable handling characteristics.

BACKGROUND

Springs are often implemented in vehicle suspensions to influence the handling and performance of a vehicle. As the vehicle drives along a road, its wheels may traverse various obstructions such as potholes, debris or the like. When a wheel encounters such an obstruction, it may experience a sudden force quickly deviating it in a substantially vertical direction. This force may displace throughout the vehicle and ultimately impose a jolt upon the vehicle operator. To reduce the experienced jolt, springs may be positioned about the vehicle suspension to absorb part of the force wherein the amount of force absorbed relates in part to the spring stiffness.

Where the vehicle springs possess high spring rates and are relatively stiff, the vehicle may possess a more sport-oriented handling. While the more sport-oriented handling may limit body motion during performance driving, it may be too rigid when traveling over everyday roads. Where the vehicle springs possess low spring rates and are relatively less stiff, the vehicle may possess a smoother ride over normal road conditions. However, relatively less stiff springs may allow for undesirable body roll during sharp turns and more dynamic maneuvers. Conventional springs often possess a constant spring stiffness requiring the vehicle operator to compromise vehicle handling or operator comfort.

Accordingly, a need exists for dynamically controlled springs and suspension systems for vehicles with variable handling characteristics.

SUMMARY

In one embodiment, a Magneto-Rheological Elastomer (MRE) spring system includes a spring, an MRE unit in cooperation with the spring, and an electromagnet. The electromagnet may be configured to produce an adjustable magnetic field, wherein when the electromagnet produces a magnetic field, the MRE unit stiffens such that the MRE spring system stiffens.

In another embodiment, a strut assembly includes a shock absorber, a spring configured to cooperate with the shock absorber, a Magneto-Rheological Elastomer (MRE) unit in cooperation with the spring, and an electromagnet. The electromagnet may be configured to produce an adjustable magnetic field, wherein when the electromagnet produces a stronger magnetic field, the MRE unit may become more stiff such that the strut assembly may become more stiff.

In yet another embodiment, a vehicle with a dynamically adjustable suspension, may include a spring, a Magneto-Rheological Elastomer (MRE) unit in cooperation with the spring, and a feedback control system. The feedback control system may be in communication with vehicle sensors for sensing road conditions, wherein the feedback control unit may generate control signals for producing a magnetic field in response to feedback signals from the vehicle sensors.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Magneto-rheological elastomers (MREs) are state-of-the-art elastomagnetic composites comprised of magnetic particles embedded in an elastomer matrix. A MRE spring system includes a dynamically adjustable stiffness. The MRE spring system generally comprises an MRE unit in cooperation with a spring and an electromagnet disposed proximate the MRE unit. The electromagnet may be configured to produce a dynamically adjustable magnetic field such that when the electromagnet produces a magnetic field, the MRE unit stiffens. As a result of the MRE unit working in cooperation with the spring, the spring system may vary its overall stiffness dependant on the magnetic field, which can be related to particular road conditions and/or driver preferences. Various embodiments of the MRE spring system, its incorporation into a suspension assembly of a vehicle and the operation thereof will be described in more detail herein.

Figure 1:
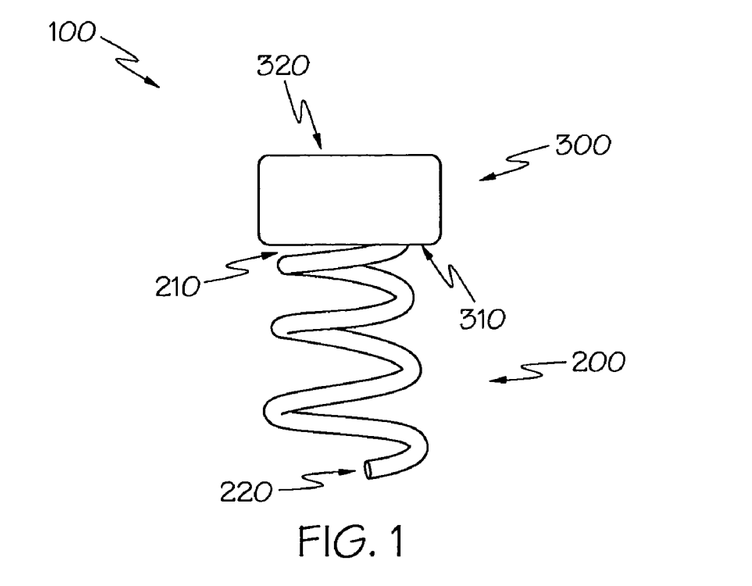
FIG. 1 depicts an MRE unit and a spring according to one or more embodiments shown and described herein.

Referring now to FIG. 1, an MRE spring system 100 may generally comprise a spring 200 and an MRE unit 300 in series. A first end 210 of the spring 200 may be configured to engage a portion of the MRE unit 300, such as a bottom end 310. A second end 220 of the spring 200 and a top end 320 of the MRE unit 300 may be left free to engage or make contact with an external apparatus. For example, in one exemplary embodiment, the MRE spring system 100 may be incorporated into a vehicle suspension such that the system aids in the shock absorption of the vehicle, wherein the second end 220 of the spring 200 and top end 320 of the MRE unit 300 may engage neighboring apparatuses to aid in the absorption of a load. The spring 200 may comprise a coil-pressure spring such that the spring 200 resists being placed in a compressed state. A spring with a relatively high spring constant may be considered a relatively stiff spring in comparison to a spring with a relatively low spring constant. The desired spring constant of the spring 200 may depend on the application. For example, where the spring 200 will carry relatively heavy loads, a greater spring constant may provide greater stiffness. In the alternative, where the spring 200 will carry relatively light loads, a lower spring constant may provide for greater flexibility in load absorption. The spring 200 may comprise a metal alloy such as steel. In the alternative, the spring 200 may comprise rubber, plastic or any other material suitable for forming a coil spring to resist pressure.

The MRE unit 300 may provide for adjustable stiffness to the assembly, and a suspension incorporating the assembly, based on an adjustable magnetic field such that the MRE spring system 100 may have an adjustable or dynamically adjustable stiffness as will be discussed later herein. The MRE unit 300 may comprise ferromagnetic particles (e.g., iron particles) suspended in an elastomer (e.g., rubber). When not subjected to a magnetic field, the MRE unit 300 may behave like any other rubber. For example, the MRE unit 300 may be deformable and pliable when not subjected to a magnetic field. However, when the MRE unit 300 is subjected to a magnetic field, the suspended ferromagnetic particles may align with one another and form rigid substructures that may thereby increase the stiffness and rigidity of the MRE unit 300 (and therefore the MRE spring system 100). Moreover, the change in stiffness of the MRE unit 300 may be proportional to the magnetic field. Thus, the greater the magnetic field applied to the MRE unit, the more stiff the MRE unit 300 may become. The change of stiffness may further depend on the composition of the MRE unit 300. In one exemplary embodiment, ferromagnetic particles may comprise about 27% of the elastomer. However, those skilled in the art will appreciate that the size, shape and distribution of the ferromagnetic particles inside the elastomer, and the size and shape of the unit may further influence the overall stiffness, and change in stiffness, of the MRE unit 300.

Figure 2:
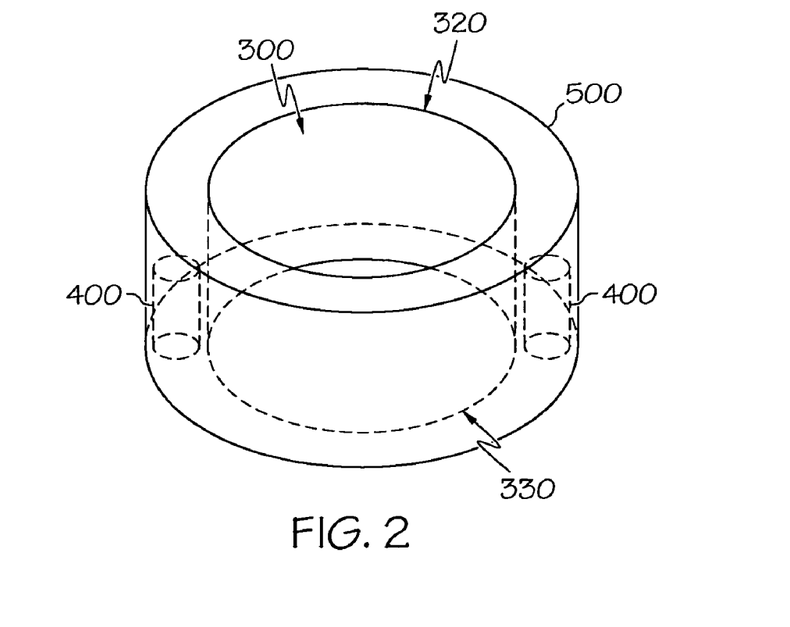
FIG. 2 depicts an MRE unit saddled by two electromagnets and a magnetic shield according to one or more embodiments shown and described herein.
Figure 3:
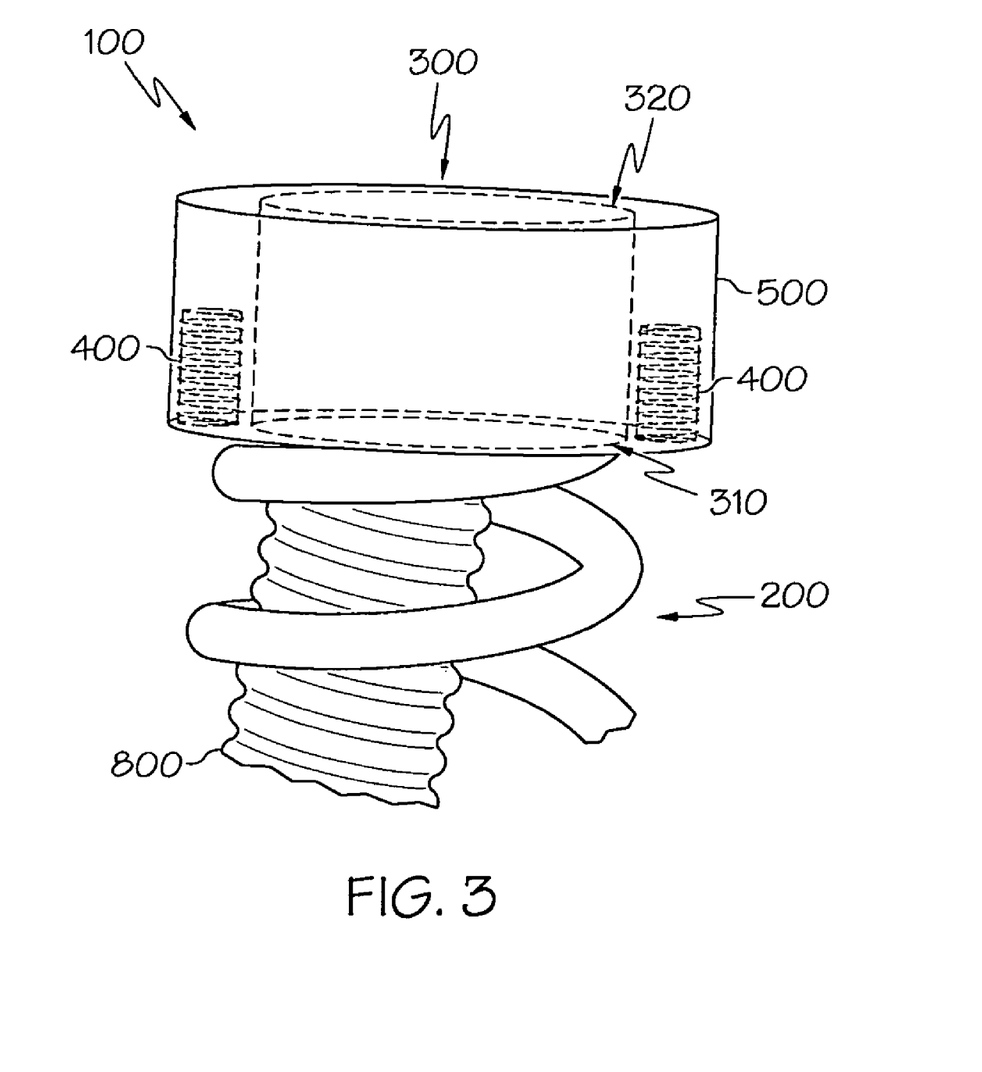
FIG. 3 depicts an MRE spring system with a shock absorber according to one or more embodiments shown and described herein.

Referring to FIGS. 2 and 3, the MRE unit 300 may be proximate to one or more electromagnets 400. The electromagnets 400 may be capable of producing an adjustable magnetic field such that the MRE unit 300 may become more stiff depending on the magnetic field produced. In one exemplary embodiment, the MRE unit 300 may be substantially cylindrical with a bottom end 310 and a top end 320. Two electromagnets 400 may saddle or surround the MRE unit 300 such that a relatively symmetrical magnetic field may be applied to the MRE unit 300. A relatively symmetrical magnetic field may ensure a substantially uniform or consistent change in stiffness throughout the MRE unit 300. In the alternative, electromagnets 400 may be relatively biased to one section of the MRE unit 300 such that the section undergoes a greater change in stiffness with respect to the rest of the MRE unit 300. In another embodiment, multiple electromagnets 400 may surround the MRE unit 300, each of which may independently be turned on and off. In such an embodiment, the magnetic field produced may be regulated by the amount of electromagnets on as opposed to adjusting the strength of each one. In another exemplary embodiment (not shown), the MRE unit 300 may surround one or more electromagnets 400. For example, the MRE unit 300 may comprise a cavity or opening about its center such that an electromagnet 400 may be disposed internal the MRE unit 300.

A magnetic shield 500 may surround or partially surround the electromagnet(s) 400 and/or the MRE unit 300 to avoid or limit electrical interference with neighboring components. In one embodiment, as depicted in FIGS. 2 and 3, the magnetic shield 500 may surround the periphery of the MRE unit 300 and the two electromagnets 400. The magnetic shield 500 may thereby limit or prevent the magnetic field produced by the electromagnets 400 from laterally traversing away from the MRE unit 300. In one embodiment, the magnetic shield 500 may comprise a height shorter than that of the MRE unit 300 (where height may be defined as the distance from the bottom end 310 to the top end 320 of the MRE unit 300). In such an embodiment, the MRE unit 300 may compress without interfering with the magnetic shield 500.

In another embodiment, the magnetic shield 500 may otherwise be disposed in a manner that substantially blocks a neighboring component from the magnetic field while allowing the spring 200 and MRE unit 300 to compress and expand. For example, the magnetic shield 500 may enclose the entire MRE spring system such that the spring 200, the MRE unit 300 and the electromagnet(s) 400 are all within the magnetic shield 500. In the alternative, the magnetic shield 500 may comprise a relatively flat wall disposed about only one side of the electromagnet 400. For example, where the MRE spring system 100 is employed toward the side of a vehicle, the magnetic shield 500 may be deployed in a configuration to only protect the direction facing the vehicle interior.

The electromagnets 400 may be connected to or associated with the spring 200, the MRE unit 300, the magnetic shield 500 or any other part of the strut assembly 1000 such that the magnetic field produced by the electromagnets 400 effectively stiffens the MRE unit 300. In the alternative, the electromagnets 400 may be connected to any other vehicle component disposed proximate the MRE spring system 100 provided the produced magnetic field effectively stiffens the MRE unit 300. The electromagnets 400 may be connected by screws, bolts, snaps, wires or any other fasteners operable to securely fix the electromagnets 400 in place.

With respect to attachment of the spring 200 to the MRE unit 300, the MRE unit 300 may simply rest on top of the spring 200 (as depicted in FIGS. 1 and 3) and remain in place based on the outside pressure applied about the MRE spring system 100. In another embodiment, the MRE unit 300 may be secured to the spring 200 by setting the spring 200 into the MRE unit 300 before curing the MRE unit 300. In yet another embodiment, the spring 200 may be secured to the MRE unit 300 with adhesives, fasteners, screws or any other method suitable for securely engaging the spring 200 with the MRE unit 300. As seen in FIG. 3, the MRE unit 300 and spring 200 may also engage a shock absorber 800 of a strut assembly as partially shown and as will be discussed later herein.

Figure 4:
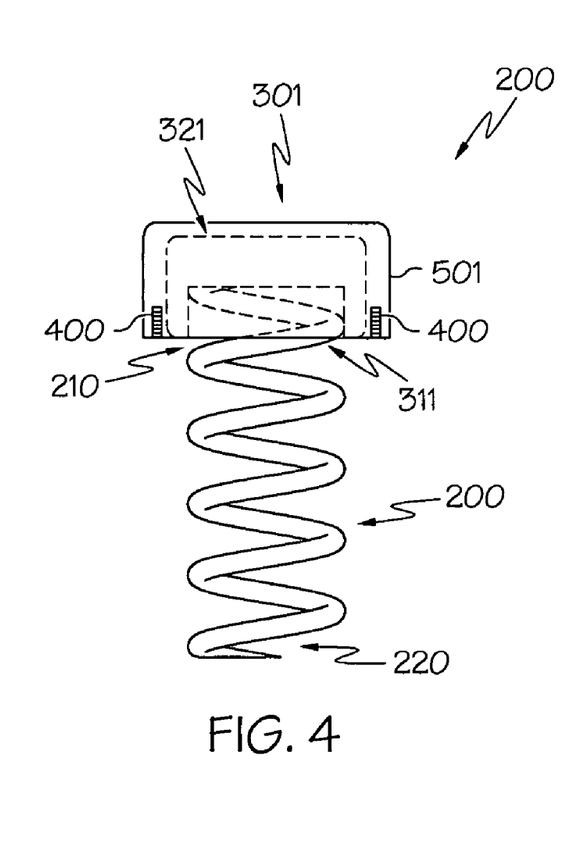
FIG. 4 depicts an MRE spring system according to one or more embodiments shown and described herein.

In another embodiment, as seen in FIG. 4, the first end 210 of the spring 200 may be disposed in an insert 311 of the MRE unit 301. The insert 311 may be a substantially circular opening extending towards the top end 321 of the MRE unit 301 such that the first end 210 of the spring 200 may by partially surrounded by the MRE unit 301. Two electromagnets 400 may saddle the MRE unit 301 and the magnetic shield 501 may surround the electromagnets 400, the MRE unit 301 and the first end 210 of the spring 200.

Figure 5:
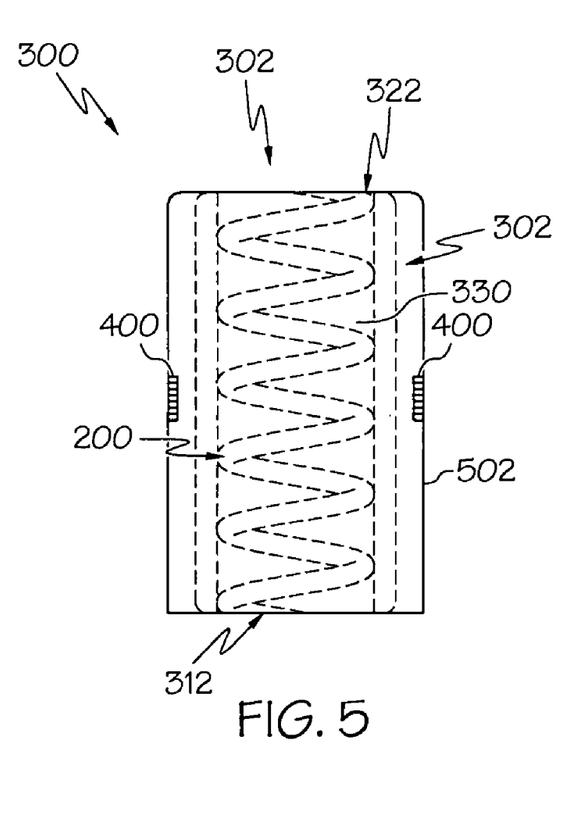
FIG. 5 depicts an MRE unit and a spring according to one or more embodiments shown and described herein.

In another embodiment, as seen in FIG. 5, the spring 200 may enter a hollow shaft 330 of the MRE unit 302 such that the spring 200 and MRE unit 302 cooperate in parallel. The hollow shaft 330 may comprise a substantially cylindrical shaft or may otherwise comprise a shaft to mirror the shape and size of the spring 200 such that the spring 200 is essentially integral with the MRE unit 302. The length between the top end 322 and the bottom end 312 of the MRE unit 302 may substantially comprise the height of the spring 200. Electromagnets 400 may be disposed about the periphery of the MRE unit 302 and a magnetic shield 502 may surround the electromagnets 400, the MRE unit 302 and the spring 200.

Figure 6:
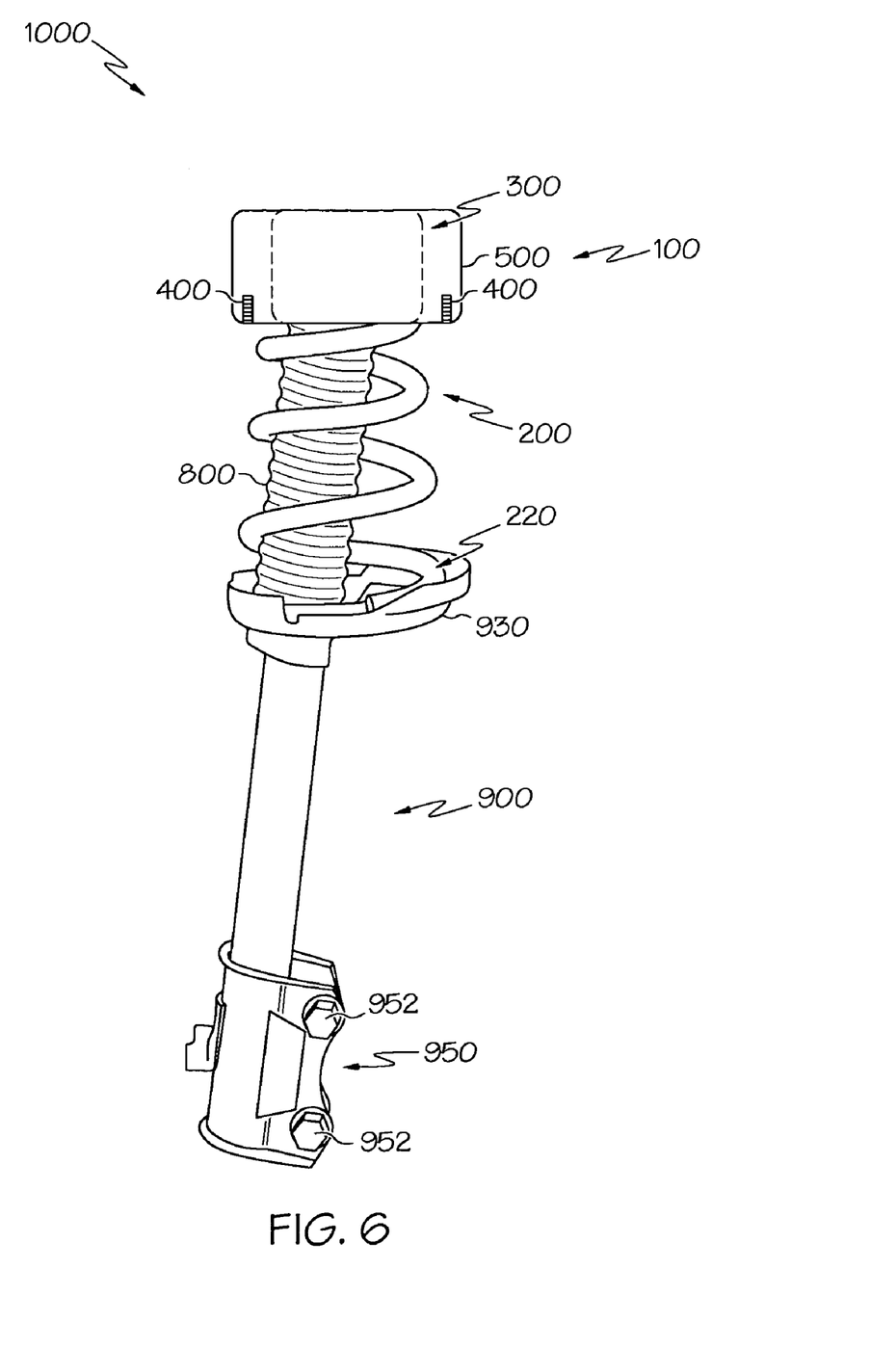
FIG. 6 depicts a strut assembly according to one or more embodiments shown and described herein.

As discussed above, the MRE spring system 100 may be employed in a variety of environments to provide dynamically adjustable stiffness. For example, as illustrated in FIG. 6, the MRE spring system 100 may be used in conjunction with a strut assembly 1000. The strut assembly 1000 may generally comprise a shock absorber 800 and a spring 200 in conjunction with an MRE unit 300. The shock absorber 800 may comprise a pneumatic shock absorber, or in the alternative, any other type of shock absorber as known to those skilled in the art. A rod 900 may connect the shock absorber 800 to a connector 950 for attaching the strut assembly 1000 to a vehicle. In one embodiment, bolts 952 may be employed on the connector 950 to securely fix one end of the strut assembly 1000 to a vehicle suspension system. In the alternative, welds, screws, or any other connector may be used to securely fix one end of the strut assembly 1000 about a vehicle suspension system.

The second end 220 of the spring 200 may engage a seat 930 on the rod 900 such that the spring 200 and shock absorber 800 are substantially aligned. The seat 930 may be disposed about the center of the strut assembly 1000 or where the rod 900 meets the shock absorber 800. In the alternative, the seat 930 may be disposed closer to an end of the strut assembly 1000. The electromagnets 400 may be disposed about the MRE unit 300 so that the magnetic field it produces effectively stiffens the MRE unit 300 and thereby stiffens the MRE spring system 100 and the overall strut assembly 1000. A magnetic shield 500 may further be disposed about the electromagnets 400 to block part of the magnetic field. The magnetic shield 500 may be focused solely around the electromagnets 400 and the MRE unit 300, or in the alternative, may substantially surround a large portion of the strut assembly 1000.

In one embodiment, the strut assembly 1000 may be part of a vehicle suspension system. For example, a vehicle may comprise a roll bar extending between the two front or two rear tires. A strut assembly 1000 may be connected to each end of the roll bar such that each tire cooperates with its own strut assembly 1000. A vehicle may thereby have a strut assembly 1000 in cooperation with every tire, or in the alternative may have a strut assembly 1000 in cooperation with only the front two or rear two tires. In one embodiment, the electromagnets may be powered by a vehicle battery. The shock absorber 800, spring 200 and MRE unit 300 may then cooperate to aid in the absorption of loads taken on by the tires.

The strut assembly 1000 with the MRE spring system 100 may further influence the handling and ride characteristics of a vehicle. For example, if the MRE spring system 100 has a relatively stiff characteristic, the vehicle may possess a more "sport-oriented" handling dynamic by limiting body motion during performance driving yet jarring the operator more frequently on everyday roads. In the alternative, if the MRE spring system 100 has a relatively less stiff characteristic, the vehicle may possess a more "leisure-oriented" handling dynamic by providing a softer ride over everyday roads yet imparting undesirable body roll during sharp handling. The spring 200 in cooperation with the MRE unit 300 may provide for adjustable stiffness such that the vehicle's handling characteristics can be varied without replacing the spring 200.

Figure 7:
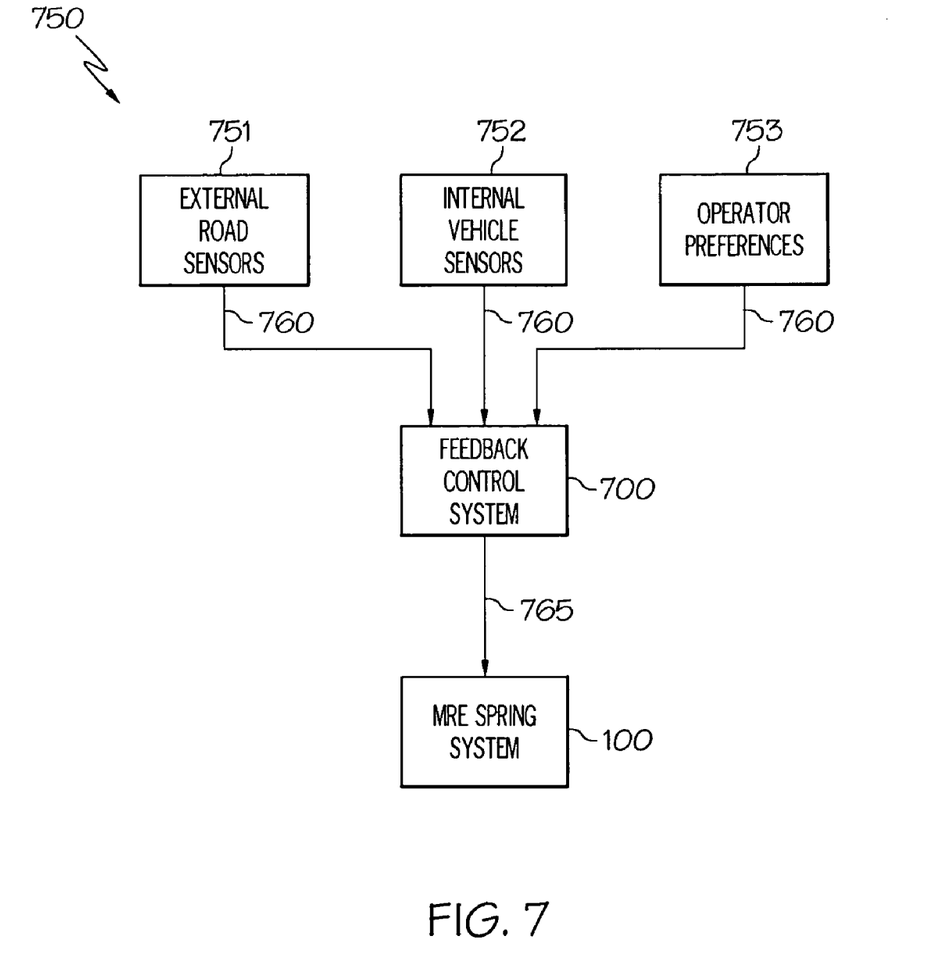
FIG. 7 depicts a logistical flowchart of a feedback control system according to one or more embodiments shown and described herein.

In one embodiment, such as that illustrated in FIGS. 6 and 7, a feedback control system 700 may dynamically adjust the overall stiffness of the MRE spring system 100 by adjusting or regulating the adjustable stiffness of the MRE unit 300 through controlling the strength of the magnetic field produced by the electromagnet(s) 400. Dynamic adjustment or regulation of the stiffness may comprise automatically adjusting stiffness based external road sensors 751, internal vehicle sensors 752 and/or selectively adjusting stiffness based on operator preferences 753. In operation, the condition sensors 750 may communicate with the feedback control system 700 through feedback signals 760. The feedback control system 700 may then communicate control signals 765 to the MRE assembly 100 to control the strength of the magnetic field produced by the electromagnet(s) 400. Thus, when the feedback control system 700 desires a greater stiffness in the MRE spring system 100 based on predetermined programs having preset ranges, the feedback control system 700 may send control signals 765 to the MRE spring system 100 to produce a magnetic field. If the electromagnet(s) 400 are already producing a magnetic field, the feedback control system 700 may have the electromagnet(s) 400 produce a strong magnetic field.

As used herein, condition sensors 750 may comprise one of external road sensors 751, internal vehicle sensors 752 and/or operator preferences 753 and combinations thereof and may be operable to send feedback signals 760 to the feedback control system to aid in the determination of the desired spring stiffness. External road sensors 751 may comprise sensors with the ability to monitor external driving conditions such as road grade, road curve, driving surface or other parameters that may influence the properties of the road. For example, external road sensors 751 may be able to identify a road with significant potholes or rough patches where a change in spring stiffness may be desired to help absorb the added discomfort. In the alternative, external road sensors 751 may further comprise other sensors that may aid in determining the desired suspension settings. Internal vehicle sensors 752 may comprise sensors to monitor various operating conditions of the vehicle. For example, internal vehicle sensors 752 may monitor the speed, acceleration, braking or incline of the vehicle to determine the current driving conditions. In addition, internal vehicle sensors 752 may monitor the roll or pitch of the vehicle to determine whether the driving conditions are more "sport-oriented" or "leisure-oriented." In another embodiment, additional sensors may determine the weight of the vehicle to aid in adjusting the spring stiffness to compensate for an additional load. For example, when luggage is added to the trunk of a vehicle, sensors may detect the change in weight distribution causing the rear tire springs to stiffen independent or in conjunction with the front tire springs. The external road sensors 751 and internal vehicle sensors 752 may enable the feedback control system 700 to automatically adjust the stiffness of the MRE unit 300.

The vehicle operator may also be able to selectively chose the vehicle's handling dynamics. By considering the operator preferences 753, the feedback control system 700 may promote a relatively stiff or loose suspension given the current conditions. For example, in one embodiment the vehicle operator may selectively choose between "Normal," "Comfort," "Sport," and "Race" settings. "Normal" may allow the MRE spring system to function across the entire applicable range of spring rates thereby automatically adjusting the spring characteristics based on data to the feedback control system 700. When in the "Comfort" setting, the feedback control system 700 may put a ceiling on how stiff the MRE spring system may become. The "Sport" setting may alter the operating parameters of the MRE spring system 100 so that the MRE unit is moderately stiff. This may further increase the baseline allowable MRE spring system 100 stiffness as well as raise the allowable ceiling MRE spring system 100 stiffness with respect to "Comfort." The "Race" setting may further raise the baseline allowable MRE spring system 100 stiffness and altogether eliminate the ceiling MRE spring system 100 stiffness. This may allow for the MRE spring system 100 to reach its maximum stiffness. The operator preferences 753 may thereby enable the feedback control system 700 to selectively adjust the stiffness of the MRE unit 300

As discussed above, the condition sensors 750 may communicate with the feedback control system 700 and the MRE spring system 100 using signals to allow for the dynamic adjustment of the spring stiffness. Conditions sensors 750 may communicate with the feedback control system by sending feedback signals 760. The dynamic adjustment amount, incorporating both automatic adjustments and selective adjustments, may then be determined by the feedback control system 700 and sent as a control signal 765 to the MRE spring system 100. In one embodiment, the dynamic adjustment of the stiffness may be completely automated by the feedback control system 700. In another embodiment, the feedback control system 700 may require further operator involvement. For example, in one embodiment the feedback control system 700 may ask for permission before it adjusts the stiffness of the MRE spring system to a suggested level.

While the feedback control system 700 was described in reference to a vehicle setting, those skilled in the art should understand that the feedback control system 700 may also be employed in other alternative embodiments.

It should now be understood that the MRE spring system as described herein may be used to dynamically adjust the stiffness of a spring system. The use of MRE units cooperating with coil springs allows for springs to exhibit an adjustable stiffness dependant on the applied magnetic field. The adjustable stiffness may improve the versatility of a spring in, for example, a vehicle strut assembly.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A magneto-rheological elastomer (MRE) spring system comprising: a spring; an MRE unit directly connected to the spring, wherein the MRE unit comprises a hollow shaft wherein the spring is disposed within the hollow shaft such that the spring and MRE unit cooperate in parallel; and, an electromagnet configured to produce an adjustable magnetic field, wherein when the electromagnet produces a magnetic field, the MRE unit stiffens such that the MRE spring system stiffens.

2. The MRE spring system of claim 1 wherein a magnetic shield substantially encloses the MRE unit and the electromagnet.

3. The MRE spring system of claim 1 wherein the adjustable magnetic field produced by the electromagnet is regulated by control signals from a feedback control system based on feedback signals from conditions sensors.

4. The MRE spring system of claim 3 wherein the condition sensors comprise external road sensors, internal vehicle sensors and/or operator preferences and combinations thereof.

5. The MRE assembly of claim 1 wherein the spring is configured to cooperate with a shock absorber in a strut assembly.

6. A strut assembly comprising: a shock absorber; a spring configured to cooperate with the shock absorber; a magneto-rheological elastomer (MRE) unit directly connected to the spring; and, an electromagnet configured to produce an adjustable magnetic field, wherein when the electromagnet produces a stronger magnetic field, the MRE unit becomes more stiff such that the strut assembly becomes more stiff.

7. The MRE spring system of claim 6 wherein the MRE unit is disposed about a first end of the spring such that the spring and MRE unit cooperate in series.

8. The strut assembly of claim 6 wherein a first end of the spring engages a seat on the shock absorber and a second end of the spring engages the MRE unit.

9. The strut assembly of claim 6 wherein a magnetic shield at least partially encloses the MRE unit and the electromagnet.

10. The strut assembly of claim 6 wherein the MRE unit is saddled by two electromagnets.

11. The strut assembly of claim 6 wherein the adjustable magnetic field produced by the electromagnet is dynamically adjusted by a feedback control system through control signals.

12. The strut assembly of claim 11 wherein condition sensors send feedback signals to the feedback control system.

13. The strut assembly of claim 12 wherein condition sensors comprising external road sensors, internal vehicle sensors and/or operator preferences.

14. A vehicle with dynamically adjustable suspension comprising: a spring, a magneto-rheological elastomer (MRE) unit directly connected to the spring, wherein the spring cooperates with a shock absorber such that a first end of the spring engages a seat on the shock absorber and a second end of the spring engages the MRE unit, an electromagnet; and, a feedback control system in communication with a condition sensor, wherein when the feedback control system receives feedback signals from the condition sensor, the feedback control system produces a control signal to control an output of the electromagnet.

15. The vehicle of claim 14 wherein the feedback control system dynamically adjusts stiffness of the MRE unit through adjusting a magnetic field produced by a the electromagnet.

16. The vehicle of claim 14 wherein the electromagnet is powered by a vehicle battery.

17. The vehicle of claim 14 wherein the condition sensor comprises external road sensors, internal vehicle sensors and/or operator preferences.

18. The vehicle of claim 17 wherein the feedback control system requests operator permission before adjusting the stiffness of the MRE unit.

* * * * *

UNITED STATES PATENT AND TRADEMARK OFFICE
CERTIFICATE OF CORRECTION

| | |
|---|---|
| PATENT NO. | : 8,210,547 B2 |
| APPLICATION NO. | : 12/485352 |
| DATED | : July 3, 2012 |
| INVENTOR(S) | : Phillip David Rodenbeck |

It is certified that error appears in the above-identified patent and that said Letters Patent is hereby corrected as shown below:

Claim 15, column 8, line 52, change "produced by a the electromagnet" to "produced by the electromagnet".

Signed and Sealed this
Twenty-eighth Day of August, 2012

David J. Kappos
*Director of the United States Patent and Trademark Office*